United States Patent
Adams et al.

(10) Patent No.: US 9,534,634 B1
(45) Date of Patent: Jan. 3, 2017

(54) BEARING SYSTEM FOR DYNAMICALLY VARYING LOADS

(71) Applicant: Lufkin Industries, LLC, Lufkin, TX (US)

(72) Inventors: Montana Z. Adams, Lufkin, TX (US); David W. Toney, Levelland, TX (US)

(73) Assignee: Lufkin Industries, LLC, Lufkin, TX (US)

( * ) Notice: Subject to any disclaimer, the term of this patent is extended or adjusted under 35 U.S.C. 154(b) by 158 days.

(21) Appl. No.: 14/503,283

(22) Filed: Sep. 30, 2014

(51) Int. Cl.
| | |
|---|---|
| *F16C 33/66* | (2006.01) |
| *F16C 33/60* | (2006.01) |
| *F16C 19/38* | (2006.01) |
| *F16C 19/54* | (2006.01) |
| *F16C 33/36* | (2006.01) |
| *F16C 19/28* | (2006.01) |
| *F16C 33/78* | (2006.01) |

(52) U.S. Cl.
CPC .......... *F16C 33/6681* (2013.01); *F16C 19/28* (2013.01); *F16C 19/385* (2013.01); *F16C 19/541* (2013.01); *F16C 33/6651* (2013.01); *F16C 33/7813* (2013.01); *F16C 2226/12* (2013.01); *F16C 2240/56* (2013.01)

(58) Field of Classification Search
CPC ....... F16C 19/364; F16C 19/38; F16C 19/383; F16C 19/385; F16C 19/542; F16C 33/60; F16C 33/605; F16C 33/6614; F16C 33/6651; F16C 33/7813; F16C 2226/12; F16C 2226/50; F16C 2240/56; F16B 4/004
USPC ............... 384/457, 462, 467, 471, 474, 504, 510,384/563–564, 585, 590, 613, 619, 551, 559, 570
See application file for complete search history.

(56) References Cited

U.S. PATENT DOCUMENTS

| | | | | |
|---|---|---|---|---|
| 2,239,891 | A | * 4/1941 | Horger ................. | B61C 17/08 384/474 |
| 2,676,856 | A | * 4/1954 | Kohse .................. | F16C 19/385 384/474 |
| 2,950,002 | A | 8/1960 | Eastburg | |
| 3,021,182 | A | 2/1962 | Schnacke | |
| 3,499,654 | A | * 3/1970 | Lower ................... | F16C 33/80 277/362 |
| 3,502,375 | A | 3/1970 | Whittum | |
| 3,603,655 | A | * 9/1971 | Keller .................... | B61F 15/14 384/459 |

(Continued)

FOREIGN PATENT DOCUMENTS

| | | | | |
|---|---|---|---|---|
| FR | 1437847 | A * | 5/1966 | ............. B21C 31/07 |
| FR | 2784147 | A1 * | 4/2000 | ........... B60B 27/001 |

(Continued)

OTHER PUBLICATIONS

International Search Report and Written Opinion issued in connection with corresponding PCT Application No. PCT/US2015/049889, dated Jan. 7, 2016.

(Continued)

*Primary Examiner* — Marcus Charles
(74) *Attorney, Agent, or Firm* — Crowe & Dunlevy, P.C.

(57) ABSTRACT

A bearing system for dynamically varying loads and load vectors comprising a plurality of bearing assemblies interference fit to a stationary component and interface fit to a rotatable component to establish relative rotational movement between the components. Each bearing system configured to establish a lubrication pathway through the bearing assemblies.

20 Claims, 6 Drawing Sheets

(56) References Cited

U.S. PATENT DOCUMENTS

| | | | | |
|---|---|---|---|---|
| 3,833,277 | A * | 9/1974 | Jones | F16C 19/386 384/459 |
| 3,940,191 | A * | 2/1976 | Tomioka | B21B 31/076 384/468 |
| 4,030,785 | A * | 6/1977 | Robinson | F16C 19/385 384/474 |
| 4,575,265 | A * | 3/1986 | Tooley | F16C 19/385 277/367 |
| 4,692,040 | A * | 9/1987 | Ebaugh | B21B 31/07 277/551 |
| 5,211,484 | A | 5/1993 | Quaglia | |
| 5,588,752 | A * | 12/1996 | Fetty | F16C 19/386 384/477 |
| 5,938,347 | A * | 8/1999 | Kuchta | F16C 33/6607 384/462 |
| 6,312,161 | B1 * | 11/2001 | Williams | F16C 19/386 384/459 |
| 6,896,270 | B1 * | 5/2005 | Sturman | B60B 35/121 277/460 |
| 7,121,728 | B2 * | 10/2006 | Pete | F16C 19/386 384/477 |
| 7,219,938 | B2 * | 5/2007 | Brister | B61F 15/22 384/459 |
| 2014/0161381 | A1 | 6/2014 | Buchanan et al. | |
| 2014/0254969 | A1 * | 9/2014 | Caspall | F16C 35/063 384/560 |

FOREIGN PATENT DOCUMENTS

| | | | | |
|---|---|---|---|---|
| JP | 11132229 A * | 5/1999 | | F16C 19/38 |
| JP | 5434519 B2 * | 3/2014 | | F16C 33/78 |

OTHER PUBLICATIONS

Timken, "AP Bearings for Industrial Applications", Timken catalog, copyright 2008 by Timken, [retrieved from the internet on Oct. 22, 2014 using <URL: http://www.timken.com/EN-US/products/Documents/Timken-AP-Bearing-Catalog. pdf>].

* cited by examiner

BEARING SYSTEM FOR DYNAMICALLY VARYING LOADS

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The inventions disclosed and taught herein relate generally to bearing systems; and more specifically relate to bearing systems for dynamically varying loads.

Description of the Related Art

A wide variety of rotating equipment utilizes one or more rolling assemblies to react loads as well as facilitate rotational motion. For example, railroad car wheels may be considered rolling assemblies and use bearing systems to react the load of the railcar and to facilitate rotational motion.

Low profile pumping units, such as those available from Lufkin Industries, LLC, utilize rolling assemblies with bearing assemblies to react loads and facilitate rotation.

When these loads on the rolling assemblies vary in direction and/or magnitude over time, such as during a rotational cycle, the longevity of the bearing systems may be compromised.

The inventions disclosed and taught herein are directed to improved bearing systems for dynamically varying loads.

BRIEF SUMMARY OF THE INVENTION

As a brief summary of certain aspects of the inventions taught herein, a bearing system is disclosed that comprises a plurality of bearing assemblies, each assembly being open at at least one end to allow the flow of lubrication through the assemblies; a first component having bearing areas for each of the bearing assemblies, and each bearing area being separated from an adjacent bearing area by a raised portion; each bearing assembly having a first portion configured to interference fit onto its first component bearing area, and a second portion of each bearing assembly contacting the raised portion of the first component; at least one retainer disposed adjacent an end of the first component and adjacent a bearing assembly; a lubrication pathway defined by the at least one retainer, the bearing assemblies and the first component; is and a second component configured to interference fit on to a third portion of each of the bearing assemblies.

As another brief summary of certain aspects of the inventions taught herein, a bearing system is disclosed that comprises at least one bearing having a first portion configured to interference fit with a first component, and a second portion of the at least one bearing assembly configured to interference fit with a second component; a first component configured to interference fit with the first portion of the at least one bearing assembly; a second component configured to interference fit with the second portion of the at least one bearing assembly; the first component is configured to be stationary and the second component is configured to be rotatable, or the first component is configured be rotatable and the second component is configured to be stationary; and the interference overlap of the interference fit between the bearing portion and stationary component is greater than the interference overlap of the interference fit between the other bearing portion and rotating component.

The claims filed with this application also provide a brief summary of certain other aspects of the inventions taught herein, and the originally filed claims are incorporated here for that purpose.

BRIEF DESCRIPTION OF THE SEVERAL VIEWS OF THE DRAWINGS

The inventions disclosed and taught herein may be better understood by reference to one or more of these figures in combination with the detailed description of specific, but non-limiting, embodiments presented herein.

DETAILED DESCRIPTION

Figure 1:
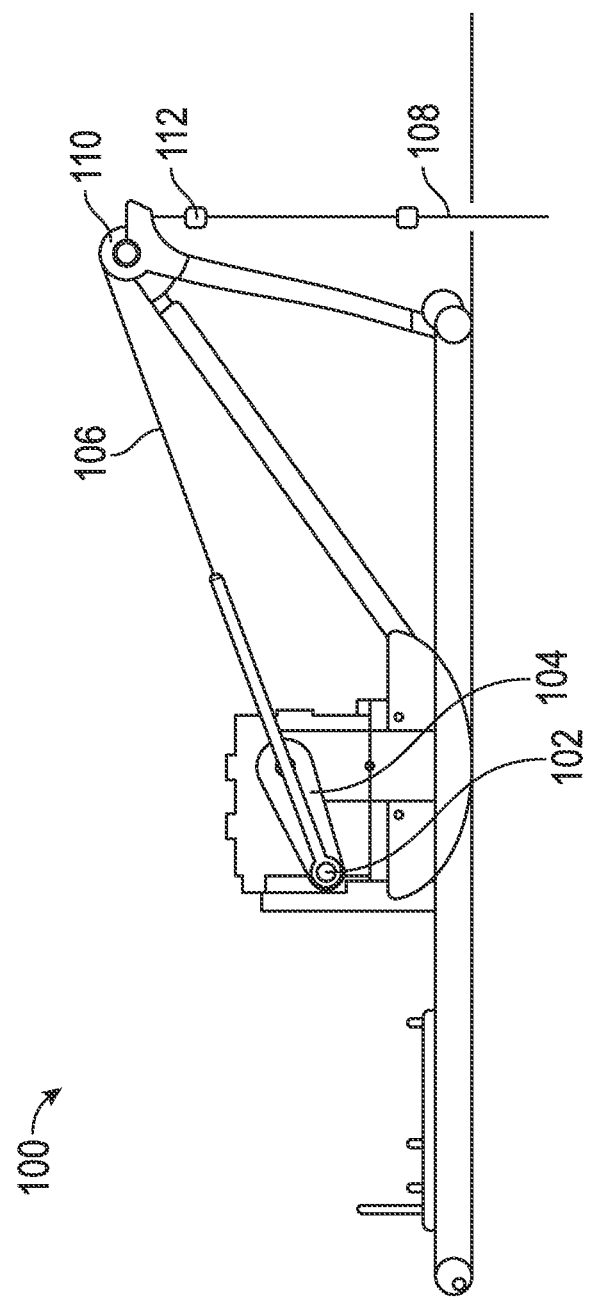
FIG. 1 illustrates a low profile pumping unit that experiences dynamically varying loads during operation and which utilizes bearing systems of the present invention.

The figures and the written description of specific structures and functions are not presented to limit the scope of what has been invented or the scope of the appended claims. Rather, the figures and written description are provided to teach any person skilled in the art to make and use the inventions for which patent protection is sought. Those skilled in the art will appreciate that not all features of a commercial embodiment utilizing one or more of the subject inventions are described or shown for the sake of clarity and understanding. Persons of skill in this art will also appreciate that the development of an actual commercial embodiment incorporating aspects of the present inventions likely will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions is disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the figures and are not intended to limit the scope of the invention or the appended claims.

In general, Applicants have created a bearing system for a rolling or rotating assembly that is subjected to dynamically varying loads and/or dynamically varying load vectors. One aspect of the inventions comprises a plurality of bearing assemblies or subassemblies, preferably, but not exclusively, having a two-row, double outer race (TDO) configuration. Each bearing assembly may be open or unsealed at at least one end to allow lubrication to flow. Each bearing assembly may have a portion, such as, but not limited to, an inner race, that is preferably interference fit to a component, such as, but not limited to, a stationary shaft. Another portion of the bearing assemblies, such as, but not limited to, an outer race, is preferably interference fit to another component, such as, but not limited to, a rotating structure. The bearing assemblies and at least one of the components cooperating to establish a lubrication pathway for the bearing assemblies. The entire bearing system is configured to react dynamically varying loads and/or load vectors to increase the longevity of bearing system.

Another aspect of the inventions comprises a bearing system having at least one bearing assembly, preferably, but not exclusively, having a TDO configuration. The at least one bearing assembly may have first and second races, each configured to be interference fit to other components. For example, and without limitation, the first race may be interference fit to a stationary component and the second race may be interference fit to a rotating component. Another aspect of the inventions comprises having a greater interference overlap between the first bearing race and the stationary component compared to the interference overlap between the second bearing race is and the rotating component. The entire bearing system is configured to react dynamically varying loads and/or load vectors to increase the longevity of bearing system.

Turning now to a description of at least one of the many possible embodiments benefitting from the present inventions, FIG. 1 provides a side view of a low profile pumping unit 100 that for purposes of this disclosure is exemplary of the type of device that can benefit from the present invention. While this disclosure is provided in the context of a low profile pump unit, neither the applicability of this invention nor the claims sought to protect this invention are limited to a particular type of equipment.

Those of skill in the art will appreciate that a pump jack is used to mechanically lift or pump liquid out of a subterranean well when the well does not have enough natural pressure to force the liquid to the surface. A pump jack converts rotary motion of a crankshaft to a vertical reciprocating motion to drive a downhole pump. A conventional pump jack comprises a walking beam design, and is often referred to as a "horse head" pump jack. A low profile pump jack, such as those offered by Lufkin Industries, is used when the vertical height of the pump jack must be minimized, such as when walking (e.g., rolling) irrigation systems are used or other equipment must be able to physically clear the pump jack.

As illustrated in FIG. 1, a low profile pumping unit 100 comprises a crankshaft 102 and an associated counterweight 104. The low profile pumping unit 100 replaces the walking beam mechanism of the "horse head" pump jack with a flexible load transfer system 106, such as a flexible belt system, and roller drum system 110 that reduces the vertical footprint of the pumping unit 100. As shown in FIG. 1, the flexible belt system 106 is mechanically coupled to the crankshaft 102 for transmitting linear motion to sucker rods string 108, and hence to a downhole pump (not shown). Flexible belt system 106 is illustrated to wrap partially around roller drum system 110 and at its distal end, the flexible belt system 106 is attached to a carrier bar 112 and is ultimately to the sucker rods string 108. While a flexible belt system 106 is illustrated, it will be appreciated the flexible load transfer system 106 may comprise one or more belts, or one or more cables or wire ropes, or any other flexible load transference system that can operatively interact with the roller drum system 110.

It will be appreciated that as the crankshaft 102 makes a 360° revolution, the rotary motion of the crankshaft 102 is converted into axial motion of the sucker rod string 108. Typically, the roller drum system 110 will make a plurality of complete revolutions both forwards and backwards for each single revolution of the crankshaft. For example and by way of example only, the roller drum system 110 illustrated in FIG. 1 may complete about 8 to 12 revolutions for each single revolution of the crankshaft 102. It will be appreciated that the roller drum system 110 (and associated supports) is required to react the load of the sucker rods string 108, which includes, without limitation, the weight of the fluid being pump and other loads. Additionally, it has been found that the direction of the loads reacted by the roller drum system 110 (i.e., the load vectors) vary over time and within each pump stroke. These dynamically varying load vectors may cause the flexible belt system 106 to "walk" off the roller drum system 110 and/or cause premature failure of the bearing system in the roller drum system 110. Thus, sophisticated and substantial bearing systems are required to support the roller drum system 110 and to ensure longevity and efficient operation of the equipment.

Figure 2A:
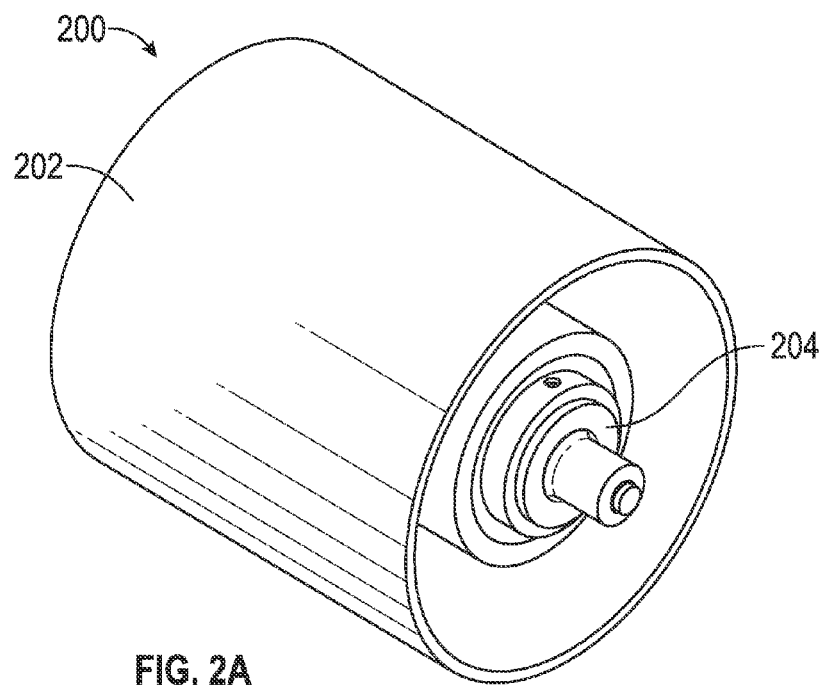
FIGS. 2A and 2B illustrate a roller assembly according to the present invention.
Figure 2B:
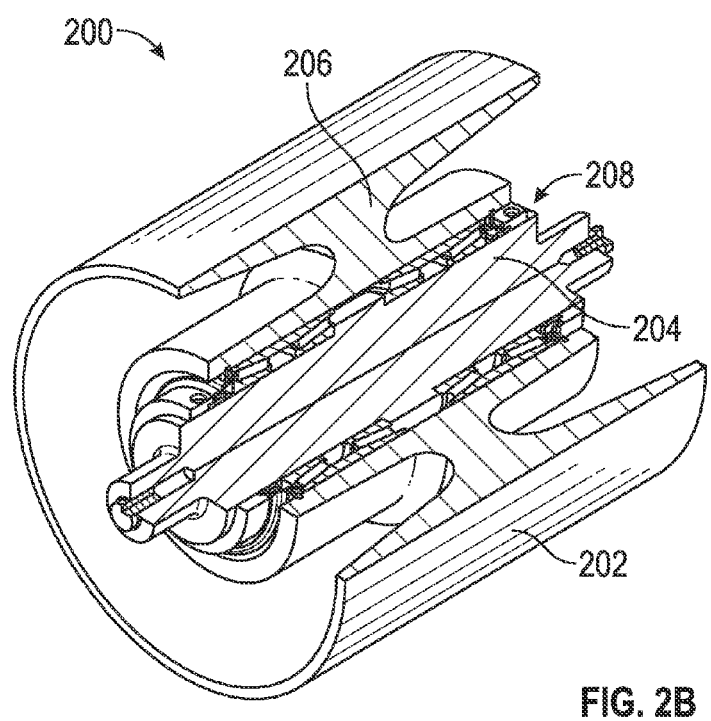

Turning now to FIGS. 2A and 2B, a single roller assembly 200 of the type that may be used as part of the roller drum system 110 for a low profile pumping unit 100 illustrated in FIG. 1. FIG. 2A illustrates a roller assembly 200 comprising an outer roller surface 202 and a shaft 204. The outer surface 202 is the surface that contacts the flexible load system 106 illustrated in FIG. 1. FIG. 2B illustrates a partial cross-section of roller assembly 200 comprised of a roller shell 206 of which the outer surface 202 is a portion. A shaft 204 is provided and a bearing assembly 208 allows the roller shell 206 to rotate relative to shaft 204.

Figure 3:
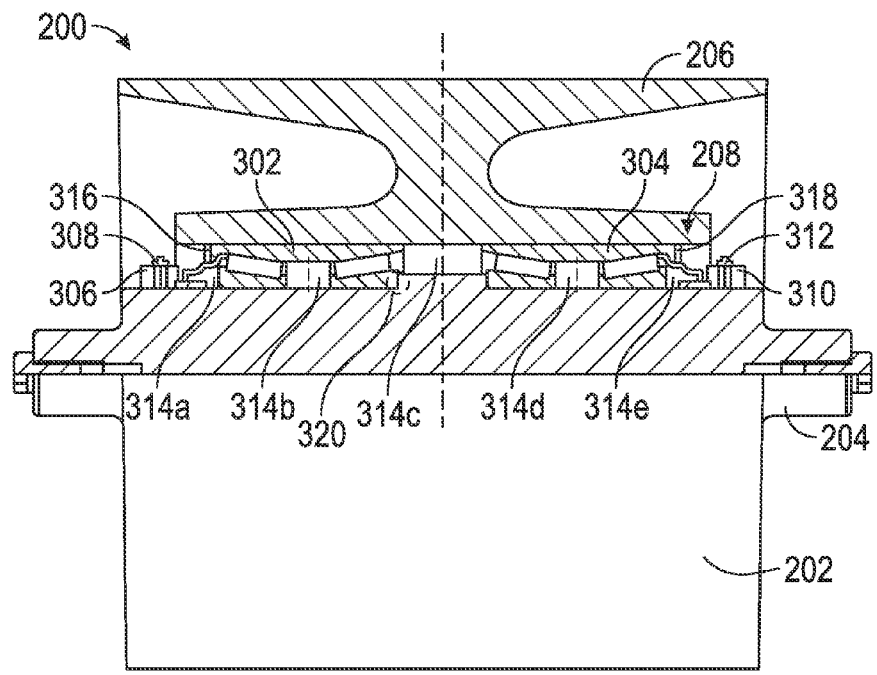
FIG. 3 illustrates a cross-sectional view of the roller assembly of FIGS. 2A and 2B.

FIG. 3 illustrates a more detailed cross-sectional view of one of many possible embodiments of a roller assembly 200. The roller assembly 200 preferably comprises a bearing assembly 208 comprising a plurality of bearing subassemblies 302 and 304. These bearing subassemblies will be described in more detail below. Starting at the left side of FIG. 3, roller assembly 200 comprises a retainer ring 306 that is configured to engage the outside diameter surface of shaft 204. Retainer ring 306 preferably comprises a lubrication fitting 308, such as a Zerk or Alemite® fitting, and has a grease channel configured to allow lubrication, such as grease, to flow from the fitting 308 to other parts of the roller assembly 200. The right side of FIG. 3 shows a second retainer ring 310, which is coupled to the outside diameter surface of shaft 204 and that provides a lubrication channel to a pressure relief fitting 312. It will be appreciated that the lubrication fitting 308 and the pressure relief fitting 312 may be on the left or right side as desired.

Extending between retainer ring 306 and retainer ring 310 is a lubrication pathway 314 comprising a plurality of portions, including pathway 314a, 314b, 314c, 314d and 314e. It is preferred that the lubrication pathway 314 comprise at least one channel and at least one gallery that can hold or store a quantity of lubrication. For example, the area between the raised portion 406 (FIG. 4) and the inner surface 402 (identified in FIG. 3 as area 314c) may be considered a lubrication gallery. Similarly, areas 314b and 314d may be considered galleries. It will be appreciated that lubrication (e.g., grease) may be injected into the fitting 308 on a retainer ring 306 and the injected grease will flow (under pressure) through the pathway 314 and until it reaches the pressure relief fitting 312. Lastly, also shown in FIG. 3 are snap rings 316 and 318.

Figure 4:
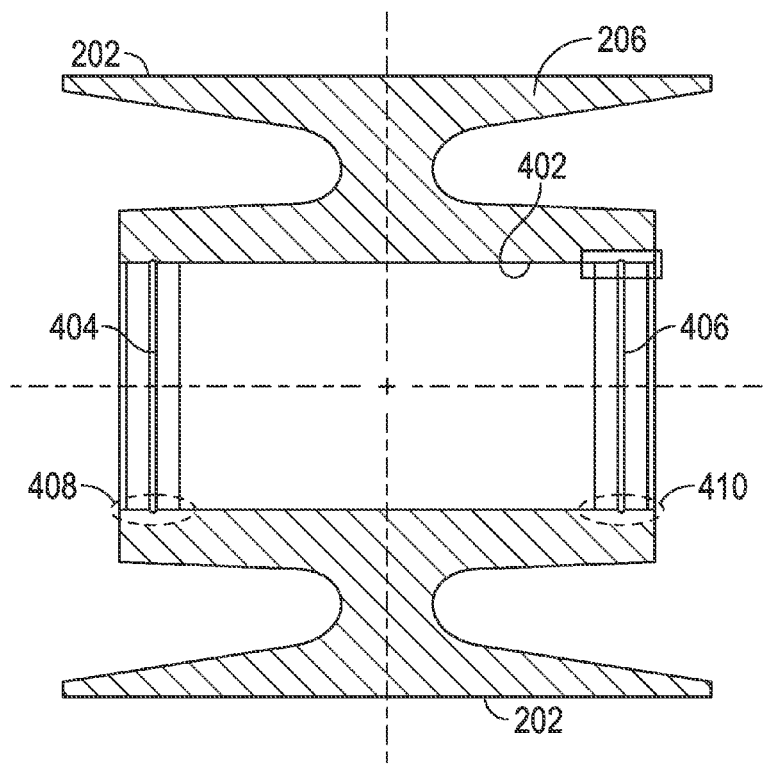
FIG. 4 illustrates a cross-sectional view of the roller shell portion of the roller assembly of FIGS. 2A and 2B.

FIG. 4 illustrates a cross-sectional view of the roller shell 204. As shown in FIG. 4, roller shell 206 has an inner surface 402 in which snap ring grooves 404 and 406 is are formed. As will be described in more detail below, the inner surface 402 is configured to have an interference fit with the outer surface of the bearing subassemblies 302 and 304. Preferably, the inner surface 402 of roller shell 206 has a surface finish of about 125 micro inches RA, which readily can be achieved by, for example, milling. Also shown in FIG. 4 is a pre-fit area 408 and 410, which preferably extends from each end portion of roller shell 204 inwardly, preferably approximately about ½ inch. This pre-fit area has an enlarged diameter to aid the installation of the bearing subassemblies during the assembly process. The roller shell 206 may be fabricated from a variety of materials including metals, composites and plastics. In the embodiment illustrated in FIG. 1 the roller shell 206 is fabricated as a metal casting. The outer surface 202 of roller shell 206 may be substantially flat, as illustrated in FIG. 4, or concave or convex as desired to effect the desired performance of the flexible load transfer system 110.

Figure 5:
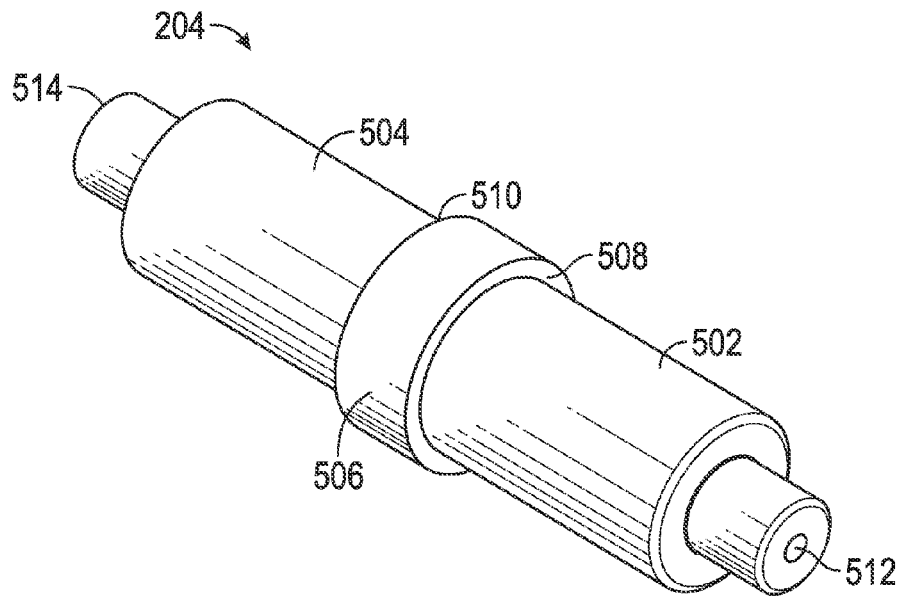
FIG. 5 illustrates the shaft of the roller assembly of FIGS. 2A and 2B.

FIG. 5 illustrates an embodiment of a shaft 204 for a single roller assembly 200. Shaft 204 comprises a first bearing area 502 and a second bearing area 504, each configured to receive a bearing subassembly. It is preferred that the surface roughness of the bearing areas be about 32 micro inches RA, such as can be obtained by grinding. Juxtaposed between the two bearing areas 502 and 504 is a raised bearing face 506. Between the raised bearing face and bearing area 502 is a bearing relief area 508, which is discussed in more detail with respect to FIG. 7 below. Between the bearing area 504 and the raised bearing face 506 is another bearing relief area 510.

The shaft illustrated in FIG. 5 is exemplary of a component that may be used for a roller assembly 200 for the low profile pumping jack illustrated in FIG. 1. For this particular embodiment, the shaft 204 is approximately 28 inches long and about 5½ inches in diameter. To react the loads generated by the low profile pumping unit 100, the shaft 204 is preferably fabricated from alloy steel, such as but not limited to ANSI 4145 alloy carbon steel having a Rockwell C hardness of about 25 to about 37. Because of the size and weight of shaft 204, threaded holes 512 and 514 may be manufactured into the ends of shaft 204 to aid the lifting of shaft 204 and assembly of roller assembly 200.

Figure 6A:
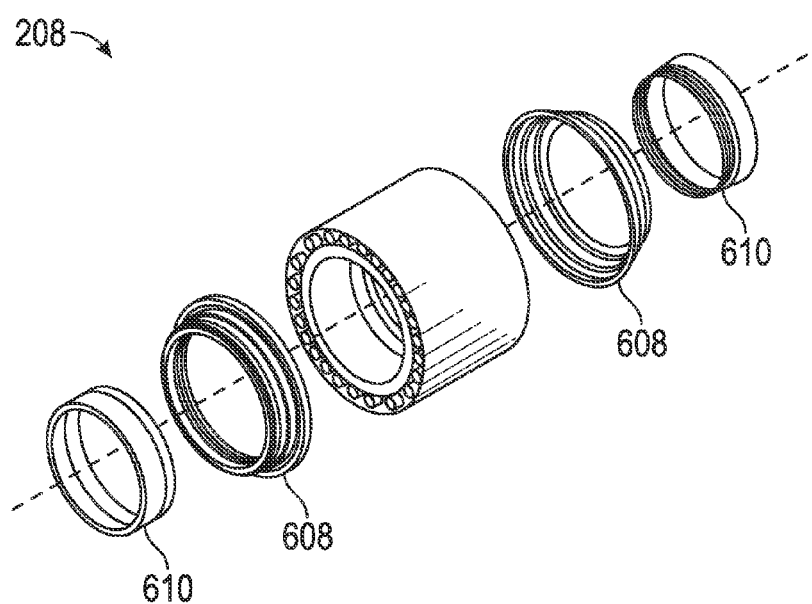
FIGS. 6A and 6B illustrate an embodiment of a bearing assembly suitable for use with the present invention.
Figure 6B:
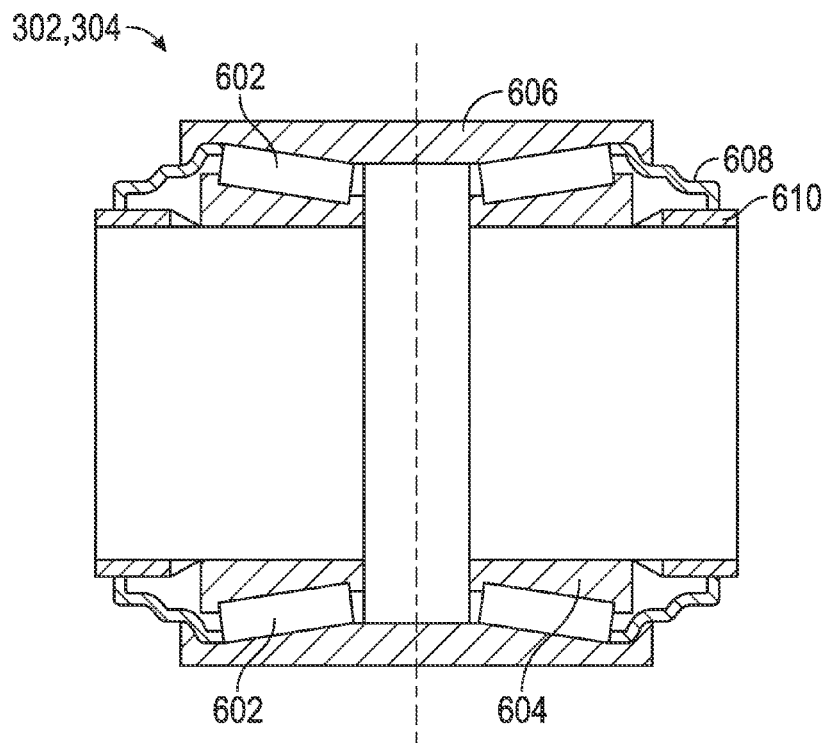

Turning now to FIGS. 6A and 6B, these figures illustrate a type of bearing subassembly 302, 304 that may be used with the roller assembly 200 described in this application. The bearing subassembly illustrated in FIG. 6A is typical of bearings referred to as a railroad bearings. For example and not limitation, the Timken Company offers railroad bearings such as its AP and AP-2 bearing systems, which are suitable, with modification as described below, for use with the present invention. These railroad bearings typically comprise two sets of TDO configured tapered bearings sandwiched between an inner race 604 and an outer race 606. Each end of the bearing subassembly 208 typically comprises seal case 608 and seal wear ring 610.

The "fit" of a bearing to its components can be characterized as loose fit (slip), transition fit, and interference fit (tight). Typically, a loose fit facilitates easy installation. However, too much looseness may allow the bearing to move or creep on the shaft or housing. Such movement can cause excessive wear or vibration and can lead to failure and bearing seizure. An interference fit (or press fit) generally will help prevent unwanted movement, but too much interference overlap may adversely affect the operation of the bearing, such as by altering the internal clearances, and may cause a rise in operating temperature that can cause failure or seizure. The general rule of thumb for bearings has been to use an interference fit between the rotating component and bearing race, and a loose fit on the non-rotating component. For example, when the inner race rotates and the outer race is stationary, conventional rules call for an interference fit at the inner race and a loose fit at the outer race. Alternately, when the inner race is stationary and the outer race rotates, conventional rules call for a loose fit at the inner race and interference fit at the outer race. These conventional rules holds true for both static loads and unbalanced loads. Thus, in the context of the low profile pumping unit 100 illustrated in FIG. 1, the conventional rules of fitment would require a non-interfering "loose" fit between the inner race 604 and the non-rotating shaft 204, and an interference fit between the outer race 606 and the roller shell 206.

Referring to FIG. 5 and FIGS. 6A and 6B, during assembly of a roller assembly 200, a bearing subassembly 302, 304 is press fit onto one of the bearing areas 502, 504 formed on shaft 204. Similarly, a second bearing subassembly 302, 304 is press fit on to the other bearing area. It is been found that to successfully react the dynamically varying loads on the roller assemblies 200 caused by the low profile pumping unit 100, the fit between the shaft 204 and the bearing subassemblies 302, 304 may be tighter than is typical for these types of bearings. For example and not limitation, in the embodiment illustrated in FIG. 1 in which the shaft 204 is stationary, the bearing subassemblies 302, 304 have an inner bearing race 604 with an inner diameter of between about 5 and about 6 inches. The corresponding bearing area 502 and 504 outside diameter on the shaft 204 also may be between about 5 and about 6 inches. It is preferred that the fit between these two components (e.g., between the inner race 604 and the bearing area 502) be an interference fit (in contrast to the conventional non-interfering loose fit) with an interference overlap of more than about 0.0010 inch, inclusive. In other words, it is preferred that the interference fit is tighter than a 0.0010 inch interference overlap, inclusive.

Similarly, it is preferred that there is an interference fit between the outer race 606 of the bearing subassemblies 302, 304 and the inner surface 402 of the roller shell 206. Again, referring to the embodiment illustrated in FIG. 1, the outer race 606 of bearing subassembly 302, 304 may have an outer diameter that varies from about 8 to 9 inches. The corresponding inner surface 402 diameter of roller shell 206 also may be about 8 to about 9 inches. It is preferred that the interference overlap between these two components (i.e., between outer race 606 and roller shell 206) be greater than about 0.0005 inch, inclusive.

Even though it is contrary to conventional rules of bearing fitment, a preferred embodiment useful with equipment experiencing dynamically varying loads and/or load vectors, such as, but not limited to, the low profile pumping unit illustrated in FIG. 1, utilizes more interference overlap at the non-rotating component (i.e., inner race 604 and shaft 204) than is used at the rotating component (i.e., outer race 606 and roller shell 206).

Figure 7:
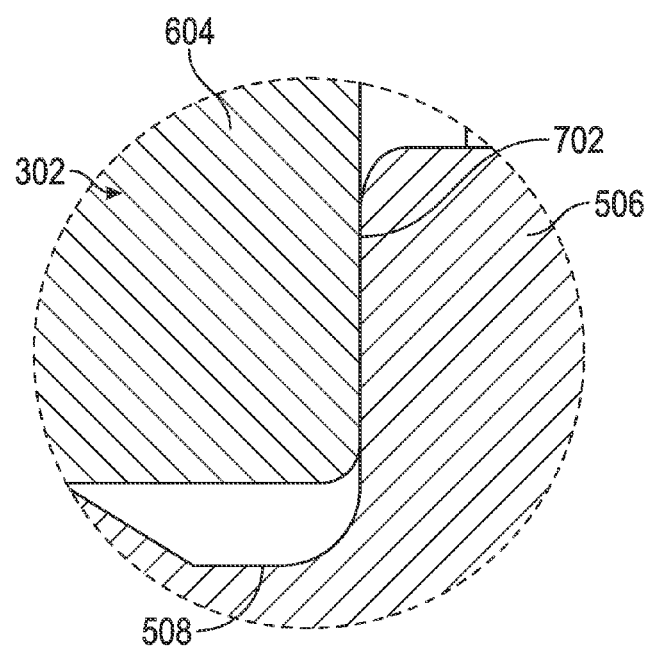
FIG. 7 illustrates a contact region between the bearing assembly of FIGS. 6A and 6B and the shaft of FIG. 5.

Because of the dynamically varying loads experienced by equipment such as illustrated in FIG. 1, the exemplary bearing illustrated in FIGS. 6A and 6B has been modified to improve its performance. Turning now to FIG. 7 and referring back to FIG. 3, the bearing subassembly 302, 304 is modified by removing the seal case 608 and seal wear ring 610 from the inboard end of the bearing subassembly 302, 304. This modification can be seen most readily by comparing region 320 in FIG. 3 with FIG. 7. FIG. 7 illustrates an enlargement of area 320 in FIG. 3. It is seen that the inner race 604 of bearing subassembly 302, 304 has the seal case 608 and the seal wear ring 610 removed, so that the inner race 604 directly reacts against the raised bearing face 406 of shaft 204. The raised bearing face 506 has a surface that functions as a race seat 702. In the illustration of FIG. 7, the purpose of the bearing seating relief 508 becomes clear. This relief allows for accurate placement of the bearing subassembly 302, 304 on shaft 204, such that the bearing subassembly abuts cleanly to race seat 702.

Figure 8:
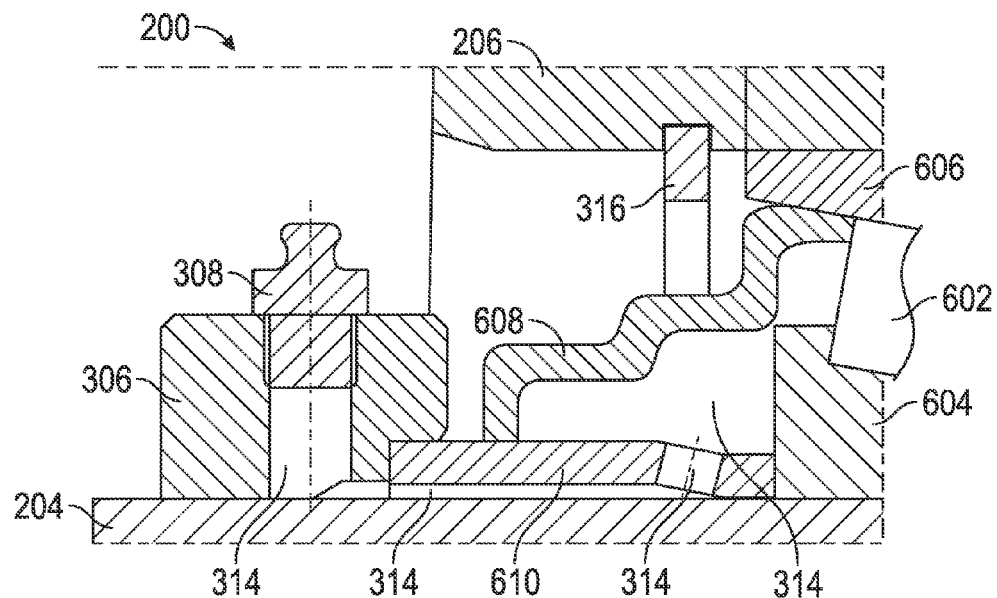
FIG. 8 illustrates a cross-sectional view of an outboard portion of the roller assembly illustrated in FIG. 3.

FIG. 8 illustrates one end of roller assembly 200. In this figure, which shows an outboard end of roller assembly 200, the seal case 608 and the seal wear ring 610 of bearing subassembly 208 are retained. Also shown in this figure is the relationship of snap ring 316 to outer bearing race 606. It is preferred that there be a gap between the snap ring 316, 318 and the face of outer race 606 of at least about 0.050 inch and most preferably at least about 0.063 inch. It can be seen that as lubrication is applied through fitting 308, lubrication flows through lubrication channels 314 to rolling is elements 602 and ultimately to the other retainer ring 308 and pressure relief fitting 312. Thus, one aspect of this invention takes two sealed bearings and modifies them by unsealing the bearings and configuring them to share a lubrication system.

Figure 9:
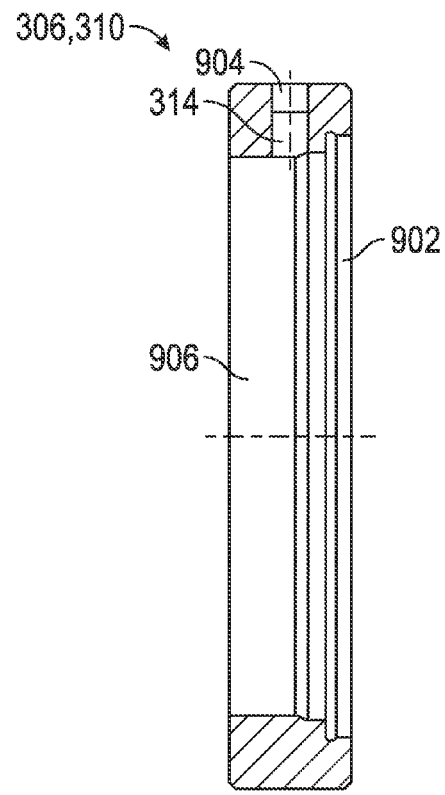
FIG. 9 illustrates a retainer ring for use with certain embodiments of the present invention.

Turning now to FIG. 9, an embodiment of the retainer ring 306, 310 is shown in a one-half cross-sectional view. The retainer ring 306, 310 may be fabricated from material compatible with the material of the shaft 204. For example, if the shaft 204 is made from ANSI 4145 carbon steel, the retainer ring 306, 310 may be fabricated from ANSI 1018 carbon steel. The retainer ring 306, 310 preferably comprises an engagement region 902 configured to accept the seal wear ring 610 as illustrated in FIG. 8. The retainer ring 306, 310 also comprises the threaded portion 904 configured to accept lubrication fitting 308 and/or the pressure relief fitting 312. The threaded portion 904 communicates to a portion of the lubrication channel 314. The retainer ring also comprises an inside diameter surface 906 configured to engage the outside diameter surface of the bearing area 502 or 504 on shaft 204. It is preferred that this inside diameter surface 906 have a surface roughness of approximately 63 micro inches RA, and that the engagement with the bearing area 402 be an interference fit. Alternately, the retainer ring may be held in place by welding, brazing, or by one or more fasteners.

Returning to FIG. 3, it will now be appreciated having the benefit of this application that a roller assembly 200 may be fabricated according to the present invention to react dynamically varying loads of all types of equipment, including, but not limited to the low profile pumping unit illustrated in FIG. 1.

Other and further embodiments utilizing one or more aspects of the inventions described above can be devised without departing from the spirit of Applicant's invention. Further, the various methods and embodiments of the methods of manufacture and assembly of the system, as well as location specifications, can be included in combination with each other to produce variations of the disclosed is methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A bearing system, comprising:
   a plurality of bearing assemblies, each assembly open at at least one end to allow the flow of lubrication through the assemblies;
   a first component having bearing areas for each of the bearing assemblies, and each bearing area separated from an adjacent bearing area by a raised portion;
   each bearing assembly having a first portion configured to interference fit onto its first component bearing area, and a second portion of each bearing assembly contacting the raised portion of the first component;
   a first retainer disposed adjacent an end of the first component and adjacent a bearing assembly;
   a lubrication pathway defined by the at least one retainer, the bearing assemblies and the first component;
   a second component configured to interference fit on to a third portion of each of the bearing assemblies, wherein the first component is stationary and the second component rotates, wherein the fitment between the stationary first component and the bearing assemblies is an interference fit, and wherein the fitment between the bearing assemblies and the stationary and rotating components are both interference fits, and the interference overlap between at least one stationary component and at least one bearing assembly is greater than the interference overlap between the rotating component and the bearing assemblies.

2. The bearing system of claim 1, wherein the first component comprises a stationary shaft.

3. The bearing system of claim 2, wherein the first portion comprises an inner bearing race, and the third portion comprises an outer bearing race.

4. The bearing system of claim 3, wherein the raised portion further comprises at least one seat disposed substantially perpendicular to an associated bearing area, and the second portion comprises a race seat of the inner race.

5. The bearing system of claim 4, further comprising a second retainer disposed adjacent the shaft opposite the first retainer.

6. The bearing system of claim 5, wherein the first and second retainers are configured as retainer rings and are secured to the shaft.

7. The bearing system of claim 6, wherein the first and second retainers are secured to the shaft through interference fit, welding, brazing, or mechanical fastening.

8. The bearing system of claim 1, wherein the bearing assemblies are TDO configured bearings.

9. A bearing system, comprising:
a plurality of bearing assemblies, each assembly open at at least one end to allow the flow of lubrication through the assemblies;
a first component having bearing areas for each of the bearing assemblies, and each bearing area separated from an adjacent bearing area by a raised portion;
each bearing assembly having a first portion configured to interference fit onto its first component bearing area, and a second portion of each bearing assembly contacting the raised portion of the first component;
a first retainer disposed adjacent an end of the first component and adjacent a bearing assembly;
a lubrication pathway defined by the at least one retainer, the bearing assemblies and the first component;
a second component configured to interference fit on to a third portion of each of the bearing assemblies, wherein the first component is stationary and the second component rotates, wherein the fitment between the stationary first component and the bearing assemblies is an interference fit, and wherein the fitment between the bearing assemblies and the stationary and rotating components are both interference fits, and the interference overlap between the stationary components and the bearing assemblies is greater than the interference overlap between the rotating components and the bearing assemblies.

10. The bearing system of claim 9, wherein the bearing assemblies are TDO configured bearings.

11. The bearing system of claim 9, wherein the first and second retainers are secured to the shaft through interference fit, welding, brazing, or mechanical fastening.

12. A bearing system, comprising:
at least one bearing having a first portion configured to interference fit with a first component, and a second portion of the at least one bearing assembly configured to interference fit with a second component;
a first component configured to interference fit with the first portion of the at least one bearing assembly;
a second component configured to interference fit with the second portion of the at least one bearing assembly;
the first component is configured to be stationary and the second component is configured to be rotatable, or the first component is configured be rotatable and the second component is configured to be stationary; and
the interference overlap of the interference fit between the bearing portion and stationary component is greater than the interference overlap of the interference fit between the other bearing portion and rotating component.

13. The bearing system of claim 12, wherein the first component further comprises, a raised portion defining a bearing assembly face seat, and wherein a third portion of the at least one bearing assembly contacts the face seat.

14. The bearing system of claim 13, further comprising a second bearing assembly having first and second portions configured to interference fit with the first and second components, and wherein the bearing assemblies and the first component cooperate to define a lubrication pathway for the bearing assemblies.

15. The bearing system of claim 14, wherein the bearing assemblies are configured in TDO arrangement, wherein the first component is a stationary shaft and the second component is a rotatable element, and further comprising a pair of retainer rings disposed at opposing ends of the shaft and spaced a predetermined distance from each bearing assembly, one retainer ring having a lubrication fitting and the other retainer ring having a pressure relief fitting, and each retainer ring configured to be a part of the lubrication pathway.

16. The bearing system of claim 9, wherein the first component comprises a stationary shaft.

17. The bearing system of claim 16, wherein the first portion comprises an inner bearing race, and the third portion comprises an outer bearing race.

18. The bearing system of claim 17, wherein the raised portion further comprises at least one seat disposed substantially perpendicular to an associated bearing area, and the second portion comprises a race seat of the inner race.

19. The bearing system of claim 18, further comprising a second retainer disposed adjacent the shaft opposite the first retainer.

20. The bearing system of claim 19, wherein the first and second retainers are configured as retainer rings and are secured to the shaft.

* * * * *